(12) United States Patent
Doverspike et al.

(10) Patent No.: US 8,897,641 B2
(45) Date of Patent: *Nov. 25, 2014

(54) REACHABILITY MATRICES SPANNING MULTIPLE DOMAINS IN AN OPTICAL NETWORK

(71) Applicant: AT&T Intellectual Property I, LP, Atlanta, GA (US)

(72) Inventors: Robert Doverspike, Tinton Falls, NJ (US); Guangzhi Li, Madison, NJ (US); Angela Lan Chiu, Holmdel, NJ (US); Monica Gerhardstein, Troy, MI (US); Yici Guo, Marlboro, NJ (US); Dongmei Wang, Madison, NJ (US); Dahai Xu, Livingston, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/867,666

(22) Filed: Apr. 22, 2013

(65) Prior Publication Data

US 2013/0236176 A1   Sep. 12, 2013

Related U.S. Application Data

(63) Continuation of application No. 13/030,375, filed on Feb. 18, 2011, now Pat. No. 8,452,176.

(51) Int. Cl.
*H04J 14/00* (2006.01)
*H04Q 11/00* (2006.01)
*H04J 14/02* (2006.01)

(52) U.S. Cl.
CPC ......... *H04Q 11/0062* (2013.01); *H04J 14/0206* (2013.01); *H04J 14/026* (2013.01); *H04J 14/0217* (2013.01); *H04J 14/0257* (2013.01); *H04J 14/0267* (2013.01); *H04J 14/0201* (2013.01)
USPC ............................... 398/57; 398/79; 370/238

(58) Field of Classification Search
None
See application file for complete search history.

(56) References Cited

U.S. PATENT DOCUMENTS

| | | | |
|---|---|---|---|
| 7,149,975 B1 * | 12/2006 | Johnson et al. ................ | 715/734 |
| 8,452,176 B2 * | 5/2013 | Doverspike et al. ............ | 398/57 |
| 2005/0069314 A1 * | 3/2005 | De Patre et al. .................. | 398/5 |
| 2005/0281271 A1 * | 12/2005 | Beshai et al. .................. | 370/400 |

OTHER PUBLICATIONS

P. Minzioni, "Unifying Theory of Compensation Techniques for Intrachannel Nonlinear Effects", Optics Express, vol. 13, No. 21, pp. 1-9 (Oct. 2005).

(Continued)

*Primary Examiner* — Ken Vanderpuye
*Assistant Examiner* — David Lambert
(74) *Attorney, Agent, or Firm* — Hoffmann & Baron, LLP

(57) ABSTRACT

A method of providing routes through heterogeneous subsystems in an optical network is disclosed, which includes generating, using a processing device, a reachability matrix based on subnetwork information; and generating, using the processing device, a topology associated with the optical network using the reachability matrix. The method also includes determining, using the processing device, a shortest path through the optical network using the reachability matrix and a cost model graph; and displaying, using a graphical user interface, subsystems associated with the shortest path, regeneration locations associated with the shortest path, wavelengths associated with the shortest path, the topology, and the shortest path. Corresponding apparatus and computer-readable storage media are also disclosed.

20 Claims, 15 Drawing Sheets

(56) References Cited

OTHER PUBLICATIONS

Li et al., Electronic Post-Compensation of WDM Transmission Impairments Using Coherent Detection and Digital Signal Processing, Optics Express, vol. 16, No. 2, pp. 1-9 (Jan. 2008).

Ip et al., "Compensation of Dispersion and Nonlinear Impairments Using Digital Backpropagation", Journal of Lilghwave Technology, vol. 26, No. 20, pp. 3416-3425 (Oct. 2008).

Savory et al., "Impact of Interchannel Nonlinearities on a Split-Step Itrachannel Nonlinear Equalizer", IEEE Photonics Technology Letters, vol. 22, No. 10, pp. 673-675 (May 2010).

Goldfarb et al., "Experimental Demonstration of Fiber Impairment Compensation Using the Split-Step Finite-Impulse-Response Filtering Method", IEEE Photonics Technology Letters, vol. 20, No. 22, pp. 1887-1889 (Nov. 2008).

Dischler et al., "Transmission of 1.2 Tb/s Continuous Waveband PDM-OFDM-FDM Signal with Spectral Efficiency of 3.3 bit/s/Hz Over 400 km of SSMF", IEEE, pp. 1-3 (2009).

Mateo et al., "Efficient Compensation of Inter-Channel NonLinear Effects Via Digital Backward Propagation in WDM Optical Transmission", Optics Express, vol. 18, No. 14, pp. 1-11 (Jul. 2010).

Yariv et al., "Compensation for Channel Dispersion by Nonlinear Optical Phase Conjugation", Optics Letters, vol. 4, No. 2, pp. 52-54 (Feb. 1979).

Li et al., "Dispersion-Compensation Schemes for 160-Gb/s 1200-km Transmission by Optical Phase Conjugation", Journal of Lightwave Technology, vol. 25, No. 8, pp. 1986-1995 (Aug. 2007).

Watanabe et al., "Exact Compensation for Both Chromatic Dispersion and Kerr Effect in a Transmission Fiber Using Optical Phase Conjugation", Journal of Lightwave Technology, vol. 14, No. 3, pp. 243-248 (Mar. 1996).

Jansen et al., "Optical Phase Conjugation for Ultra Long-Haul Phase-Shift-Keyed Transmission", Journal of Lightwave Technology, vol. 24, No. 1, pp. 54-64 (Jan. 2006).

Shieh et al., "Coherent Optical OFDM: Theory and Design", Optics Express, vol. 16, No. 2, pp. 1-19 (Jan. 2008).

\* cited by examiner

REACHABILITY MATRICES SPANNING MULTIPLE DOMAINS IN AN OPTICAL NETWORK

CROSS REFERENCE TO RELATED APPLICATION

This application is a continuation of U.S. patent application Ser. No. 13/030,375 filed on Feb. 18, 2011, which is incorporated herein by reference in its entirety.

BACKGROUND

1. Technical Field

The present disclosure relates to optical networks, and more specifically relates to a method and apparatus for generating reachability matrices to aid in routing across multiple vendor domains in an optical network.

2. Brief Description of the Related Art

With technology evolution and industry consolidation, a large carrier's core Dense Wavelength Division Multiplexed (DWDM) optical network may include several DWDM subsystems from different vendors using different technologies, such as wavelengths of differing rates to transport a variety of end-to-end circuits or signals, such as, but not limited to, SONET (e.g., rates OC-48, OC-192, or OC-768) or Ethernet (e.g., 1, 10, or 100 Gigabit Ethernet), or ITU OTN rates (e.g., ODU-0 through ODU-4), and optical reachability parameters. However, a customer requesting an end-to-end high speed connection should not need to be aware of the underlying heterogeneous subsystems. For example, a user requesting a connection between New York City and San Francisco is only concerned with the connectivity and the requested bandwidth or capacity being satisfied by the connection. It is the carrier's responsibility to optimize connection routing in its own heterogeneous network to save cost and ensure high network availability. Traditional point-to-point DWDM subsystems normally support 2.5 Gb/s per wavelength. Most recent ROADM (Reconfigurable Optical Add-Drop Multiplexer)-based subsystems can support higher rate wavelengths.

In DWDM networks, the quality of a signal degrades due to physical impairments that accumulate along its path. This signal degradation may lead to an unacceptable bit-error rate (BER). Hence, after a certain impairment threshold, the signal needs to be regenerated in order to regain its original quality. In practice, signals are regenerated on a per-wavelength basis and not on a per-fiber basis using an Optical-Electrical-Optical (OEO) regenerator. This signal path limitation is referred to as the reachability limitation. Different vendors may apply different technologies to handle these impairments and use different fiber parameters or formulas to judge whether a path is reachable or not. There are no common parameters or formulas to calculate the BER of a path over multiple subsystems. In fact, the reachability parameters or formula are vendor-proprietary property, and thus not publicly available. These parameters and formulas are usually built in each vendor's subsystem planning tool.

SUMMARY

Objects and features of the disclosure will become apparent from the following detailed description considered in conjunction with the accompanying drawings. It is to be understood, however, that the drawings are designed as an illustration only and not as a definition of the limits of this disclosure.

The disclosure is directed to a method of providing routes through heterogeneous subsystems in an optical network, which includes generating, using a processing device, a reachability matrix based on subnetwork information; generating, using the processing device, a topology associated with the optical network using the reachability matrix; determining, using the processing device, a shortest path through the optical network using the reachability matrix and a cost model graph; and displaying, using a graphical user interface, subsystems associated with the shortest path, regeneration locations associated with the shortest path, wavelengths associated with the shortest path, the topology, and the shortest path.

Generating the reachability matrix may also include obtaining network topology information G(V,E) representing the optical network, wherein V represents nodes associated with the optical network, E represents links associated with the optical network, and the optical network includes a plurality of subnetwork types; determining, using a vendor planning tool, a plurality of shortest paths $p_1, \ldots p_k$ linking a node pair (u,v), wherein u represents a first node associated with the optical network, v represents a second node associated with the optical network, u and v are elements of V, and k represents a parameter greater than 1; determining whether each of the plurality of shortest paths $p_1, \ldots p_k$ is reachable, wherein the shortest paths that are reachable are the reachable paths; and providing the reachable paths.

The method may also include modifying k such that the reachability matrix remains the same, and generating the reachability matrix using at least one longest reachable path and a shortest weight path based on the cost model graph. The method may also include displaying, by the graphical user interface, at least one of optimized routes and link capacity utilization, wherein the graphical user interface supports multiple users simultaneously, and includes a menu, control panel, map panel, and information panel.

The disclosure is further directed to a non-transitory computer-readable medium storing instructions, that when executed by a processing device, cause the processing device to provide routes through heterogeneous subsystems in an optical network by at least generating a reachability matrix based on subnetwork information; generating a topology associated with the optical network using the reachability matrix; determining a shortest path through the optical network using the reachability matrix and a cost model graph; and providing, using a graphical user interface, subsystems associated with the shortest path, regeneration locations associated with the shortest path, wavelengths associated with the shortest path, the topology, and the shortest path.

The non-transitory computer-readable medium may store further instructions, that when executed by a processing device, cause the processing device to provide routes through heterogeneous subsystems in an optical network by generating the reachability matrix by at least obtaining network topology information G(V,E) representing the optical network, wherein V represents nodes associated with the optical network, E represents links associated with the optical network, and the optical network includes a plurality of subnetwork types; determining, using a vendor planning tool, a plurality of shortest paths $p_1, \ldots p_k$ linking a node pair (u,v), wherein u represents a first node associated with the optical network, v represents a second node associated with the optical network, u and v are elements of V, and k represents a parameter greater than 1; determining whether each of the plurality of shortest paths $p_1, \ldots p_k$ is reachable, wherein the shortest paths that are reachable are the reachable paths; and providing the reachable paths.

The non-transitory computer-readable medium may store further instructions that, when executed by a processing device, cause the processing device to provide routes through heterogeneous subsystems in an optical network by at least modifying k such that the reachability matrix remains the same, and generating the reachability matrix using at least one longest reachable path and a shortest weight path based on the cost model graph.

The disclosure is yet further directed to an apparatus to provide routes through heterogeneous subsystems in an optical network, which includes a processing device and a graphical user interface. The processing device is configured to generate a reachability matrix based on subnetwork information, generate a topology associated with the optical network using the reachability matrix, and determine a shortest path through the optical network using the reachability matrix and a cost model graph. The graphical user interface displays subsystems associated with the shortest path, regeneration locations associated with the shortest path, wavelengths associated with the shortest path, the topology, and the shortest path.

The subnetwork information may include latitude and longitude information associated with nodes in the optical network, at least one of underlying fiber span information, capacity information, and available wavelength information associated with links in the optical network, and may represent existing circuits in the optical network. The subnetwork information may include a section report, which includes system type, node identification, effective date, terminate date, and project identification associated with a dense wavelength division multiplexer section in the subnetwork. The processing device may be configured to generate the reachability matrix by obtaining network topology information, wherein G(V,E) represents the optical network, V represents nodes associated with the optical network, and E represents links associated with the optical network. The optical network includes a plurality of subnetwork types, and the processing device determines, using a vendor planning tool, a plurality of shortest paths $p_1, \ldots p_k$ linking a node pair (u,v), wherein u represents a first node associated with the optical network, v represents a second node associated with the optical network, u and v are elements of V, and k represents a parameter greater than 1. The processing device may determine whether each of the plurality of shortest paths $p_1, \ldots p_k$ is reachable, wherein the shortest paths that are reachable are the reachable paths Te graphical user interface may display the reachable paths.

The processing device may generate the reachability matrix using at least one longest reachable path and a shortest weight path based on the cost model graph. The graphical user interface may display at least one of optimized routes and link capacity utilization. The graphical user interface may support multiple users simultaneously, and include a menu, control panel, map panel, and information panel.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

DETAILED DESCRIPTION

Currently, there is no existing solution or tool to route a circuit over a heterogeneous core DWDM network with a multi-vendor environment efficiently, even though each vendor may provide its own planning tool to route a circuit inside its own sub-system. The reason for this is that there are no common parameters among vendor sub-networks concerning reachability. Rather, each sub-network has its own reachability parameters or formula to calculate whether a path is reachable or not. From this function of each vendor planning tool, a reachability matrix solution is presented in this disclosure: first a reachability matrix for each sub-network, that is, the list of all possible reachable paths in the sub-network is generated; then a cost model graph is generated in accordance with these reachability matrices and cost-related weights are assigned to the edges of the cost model graph. Next, a shortest path algorithm is applied to the cost model graph to find a cost efficient path on the graph. Finally, the selected shortest path over the cost model graph is mapped to the DWDM system for DWDM sub-network selection, regenerator placement, and wavelength assignment.

Due to fiber availability and traffic changes, the carrier may reroute some DWDM systems from existing fibers to new fibers, which is referred to as DWDM system roll. During DWDM system roll, there are time gaps between the system planning and circuit provisioning tasks. This disclosure describes a solution to avoid this time gap problem.

Figure 1:
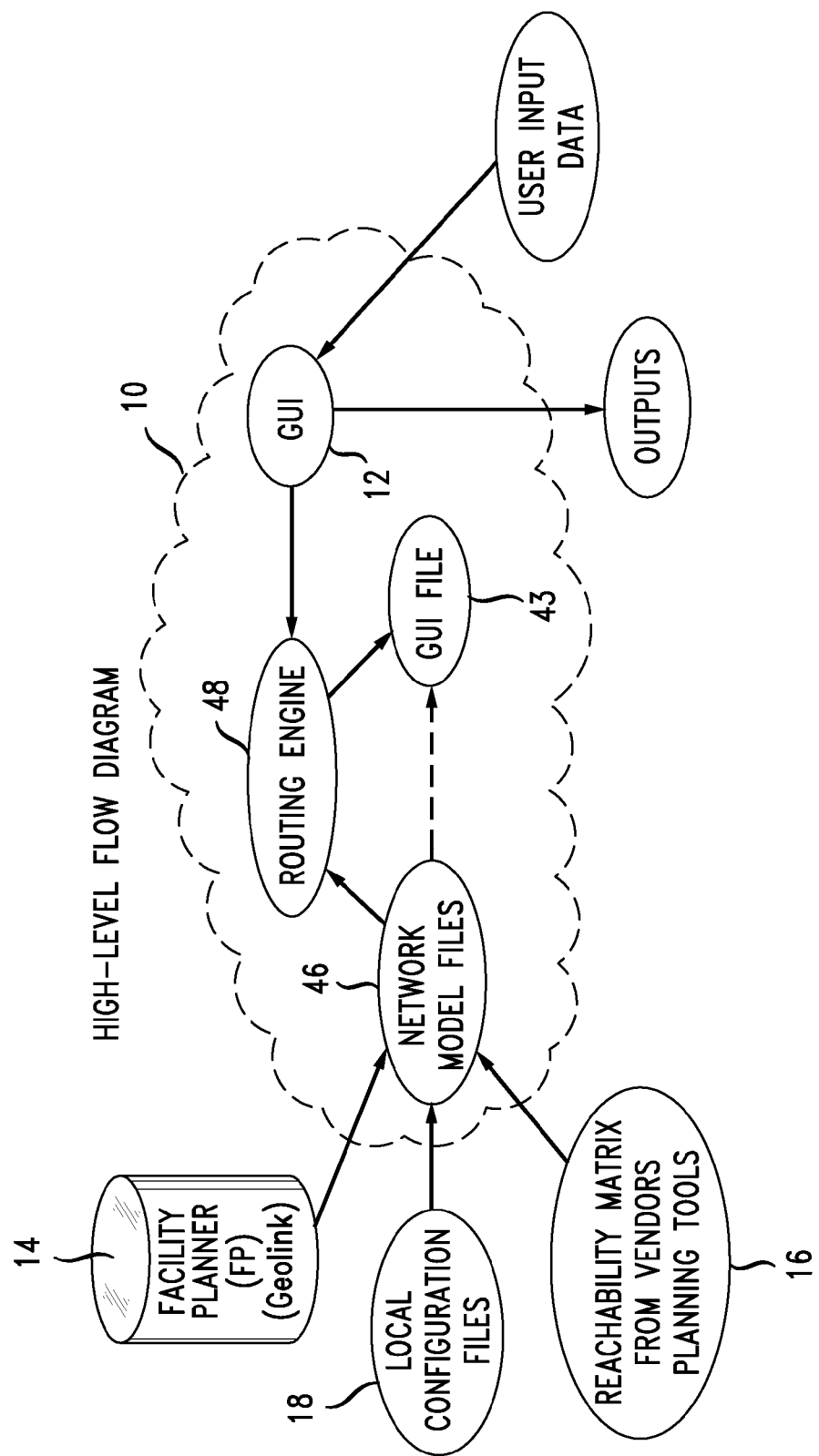
FIG. 1 is a high-level block diagram of a routing tool to be used over multiple DWDM subsystems in accordance with the present disclosure.
Figure 2A:
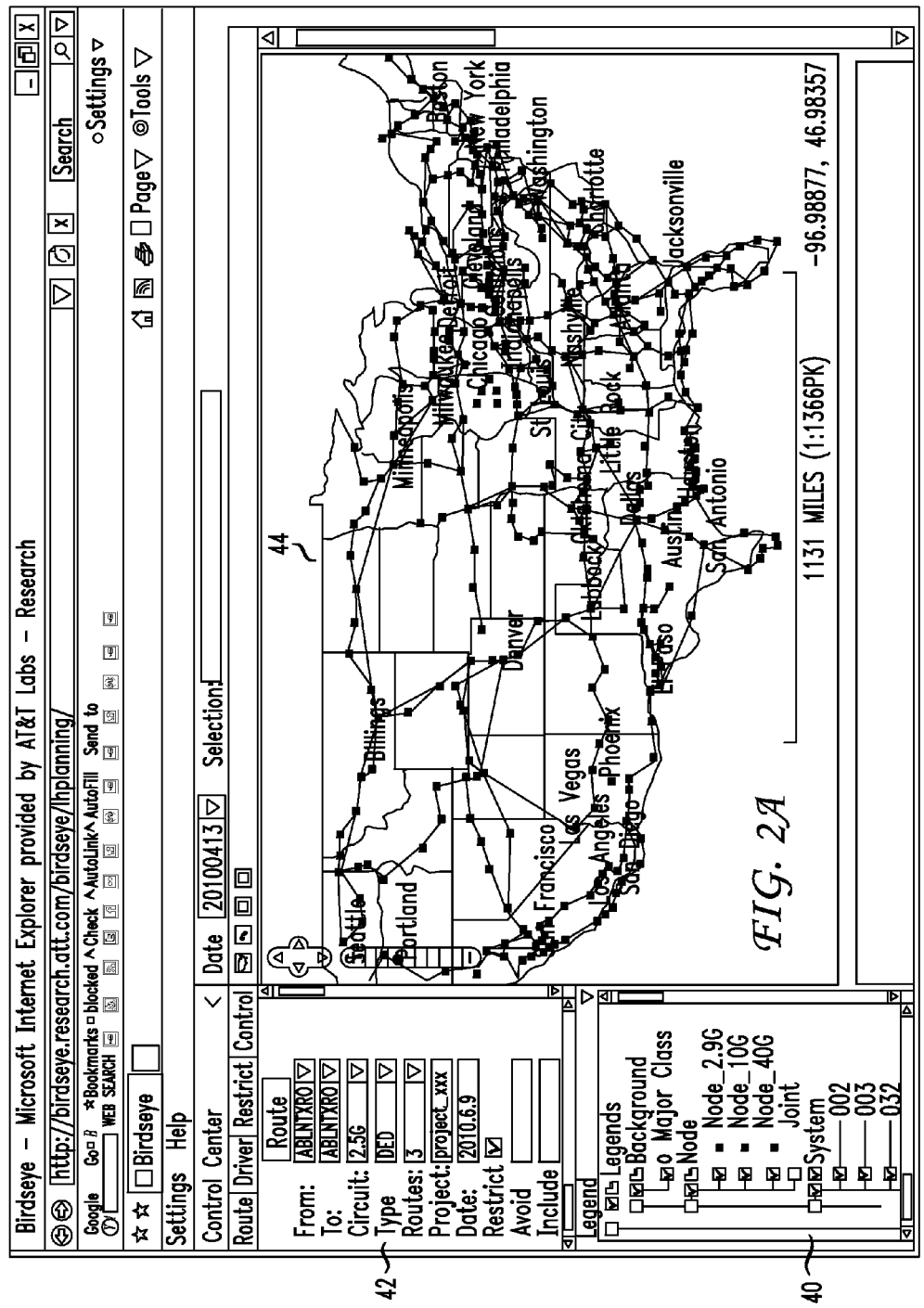
FIGS. 2A-F are screenshots of a Graphical User Interface (GUI) showing various scales of the tool.
Figure 2B:
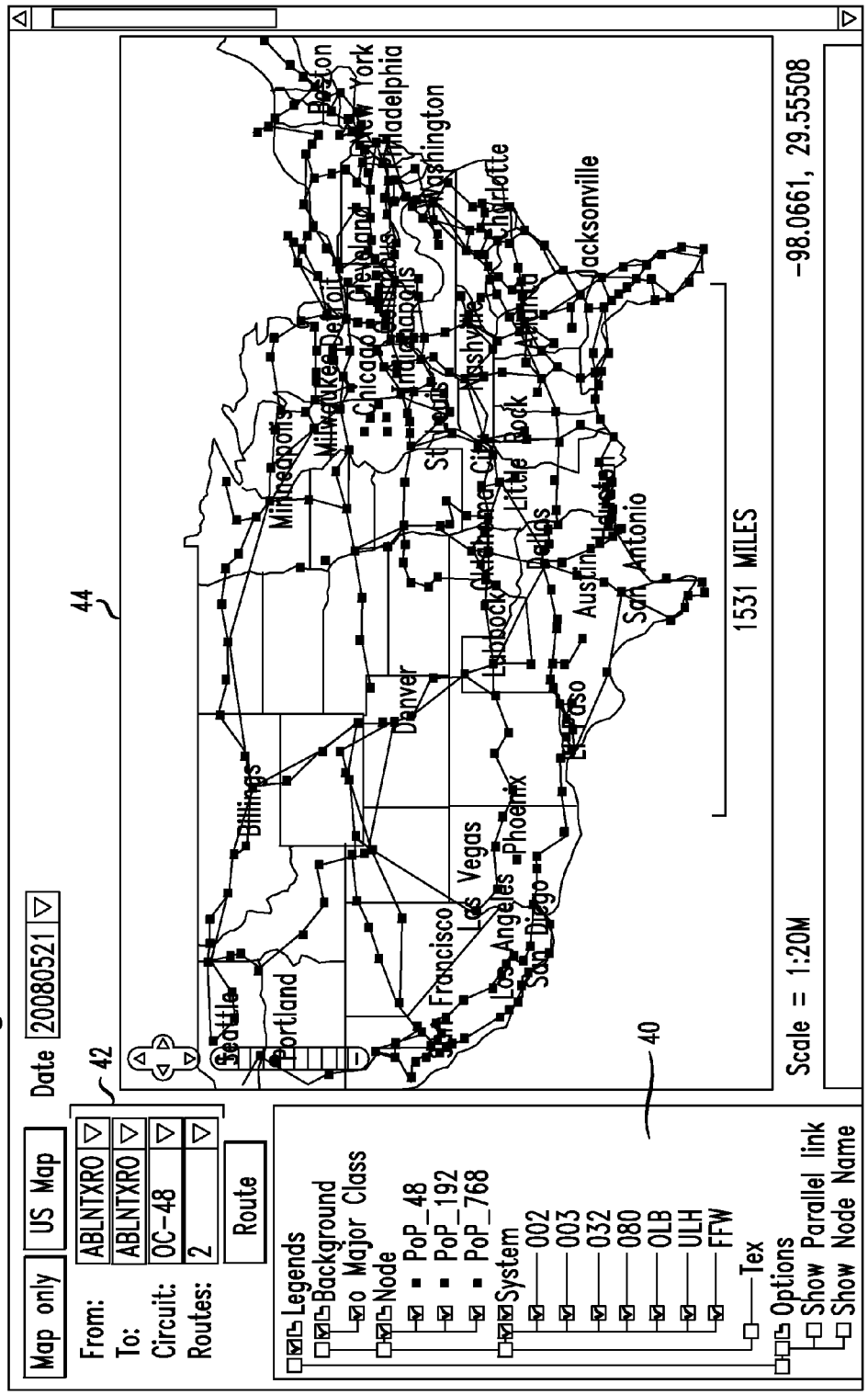
Figure 2C:
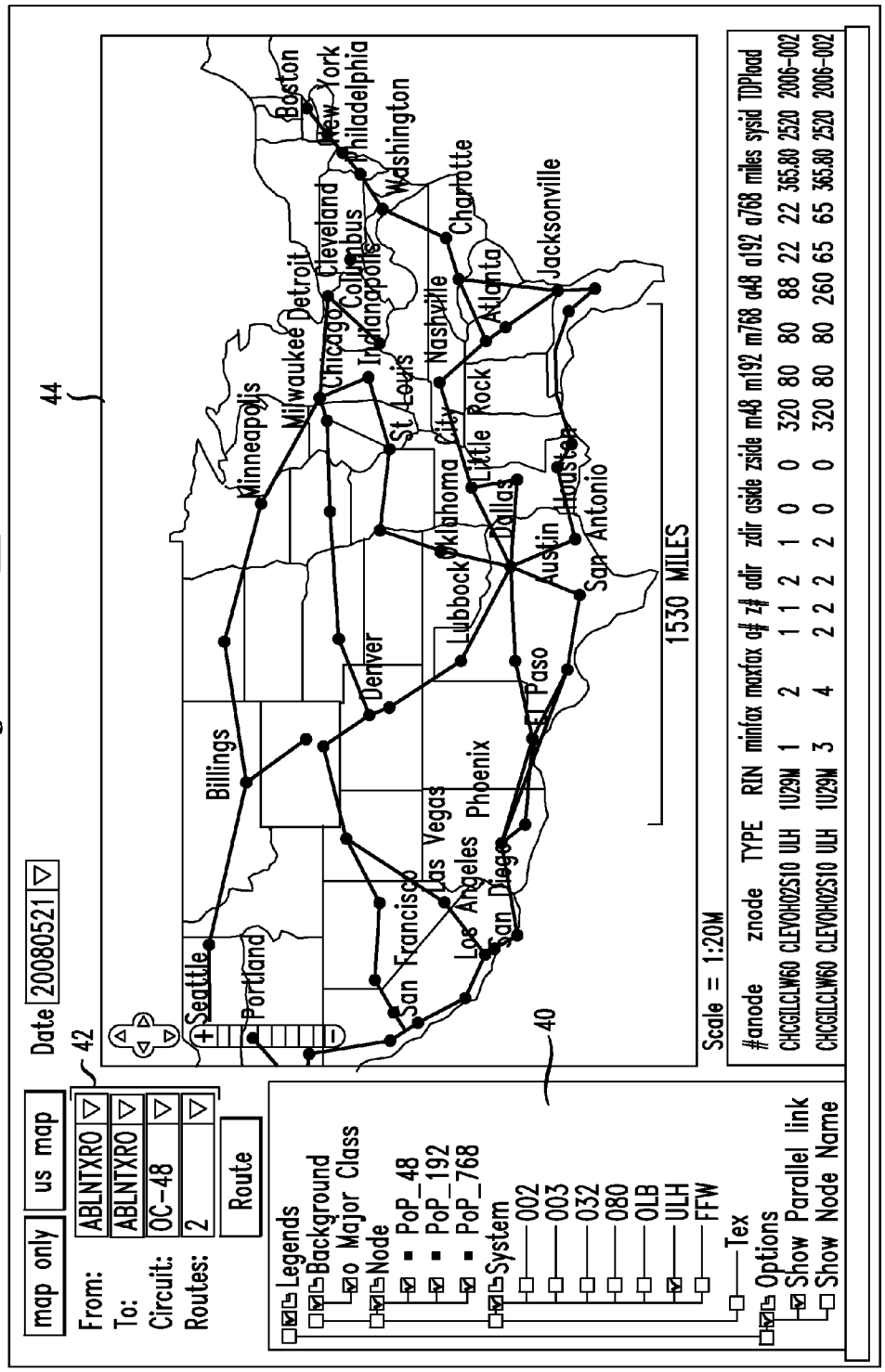
Figure 2D:
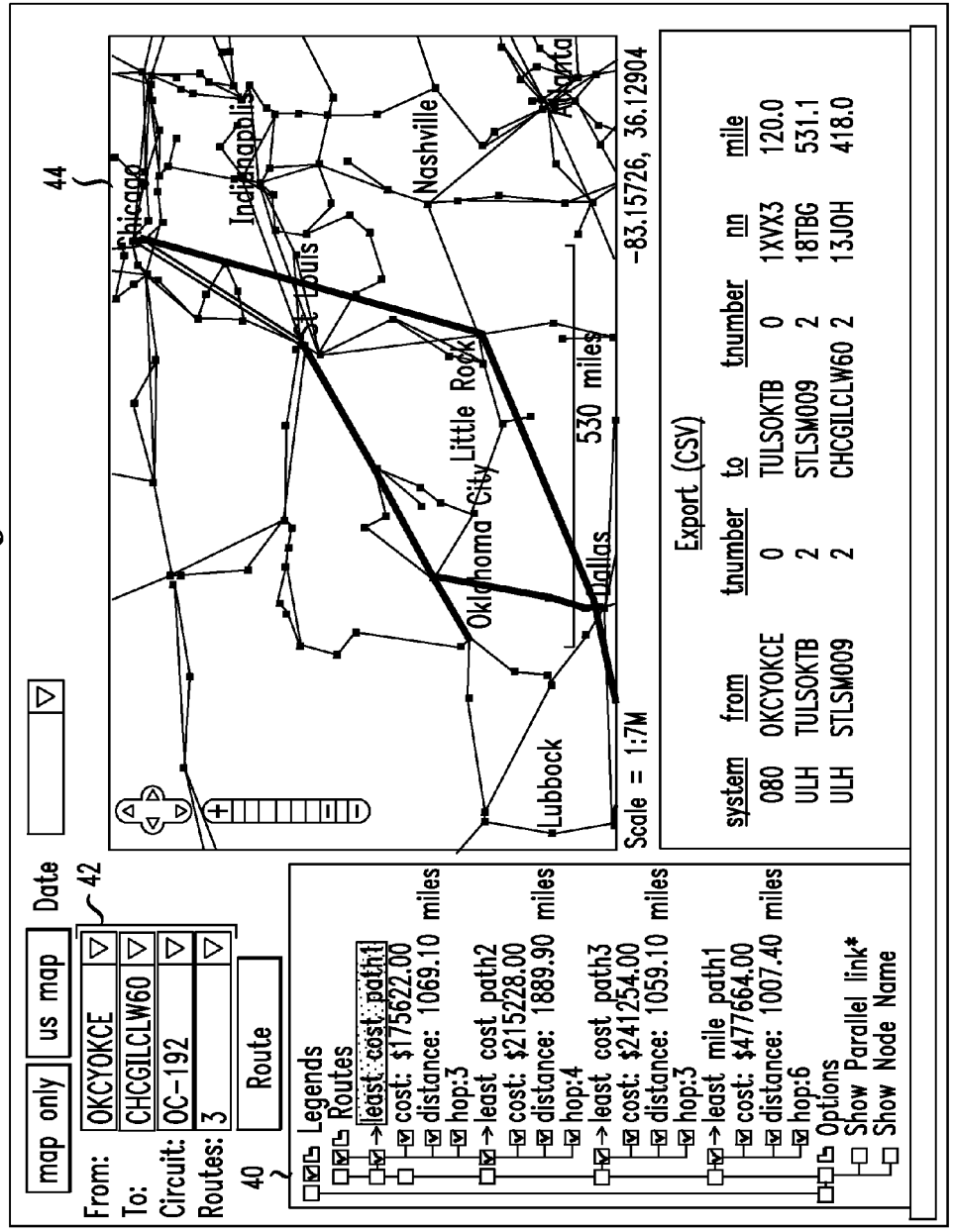
Figure 2E:
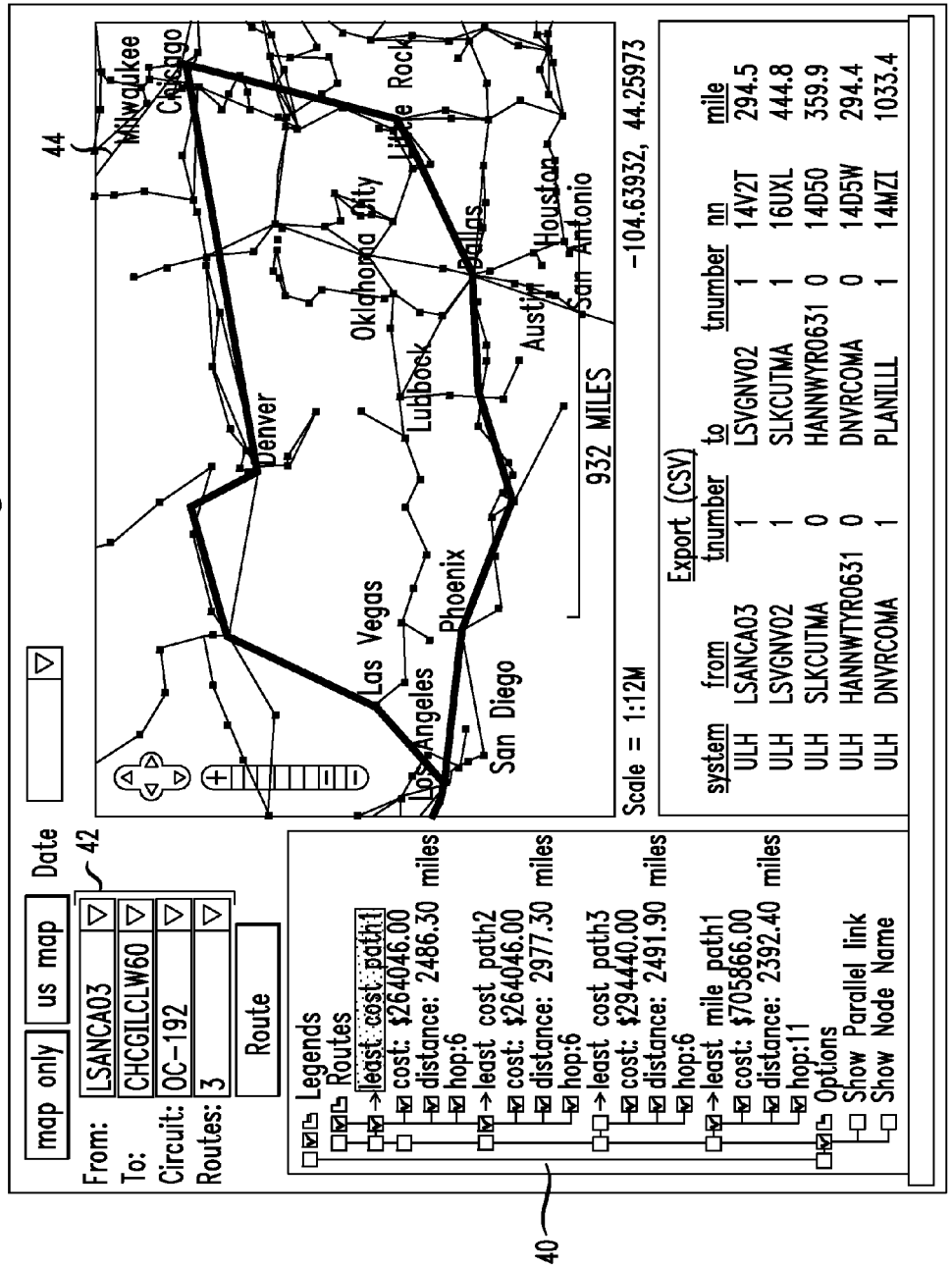
Figure 2F:
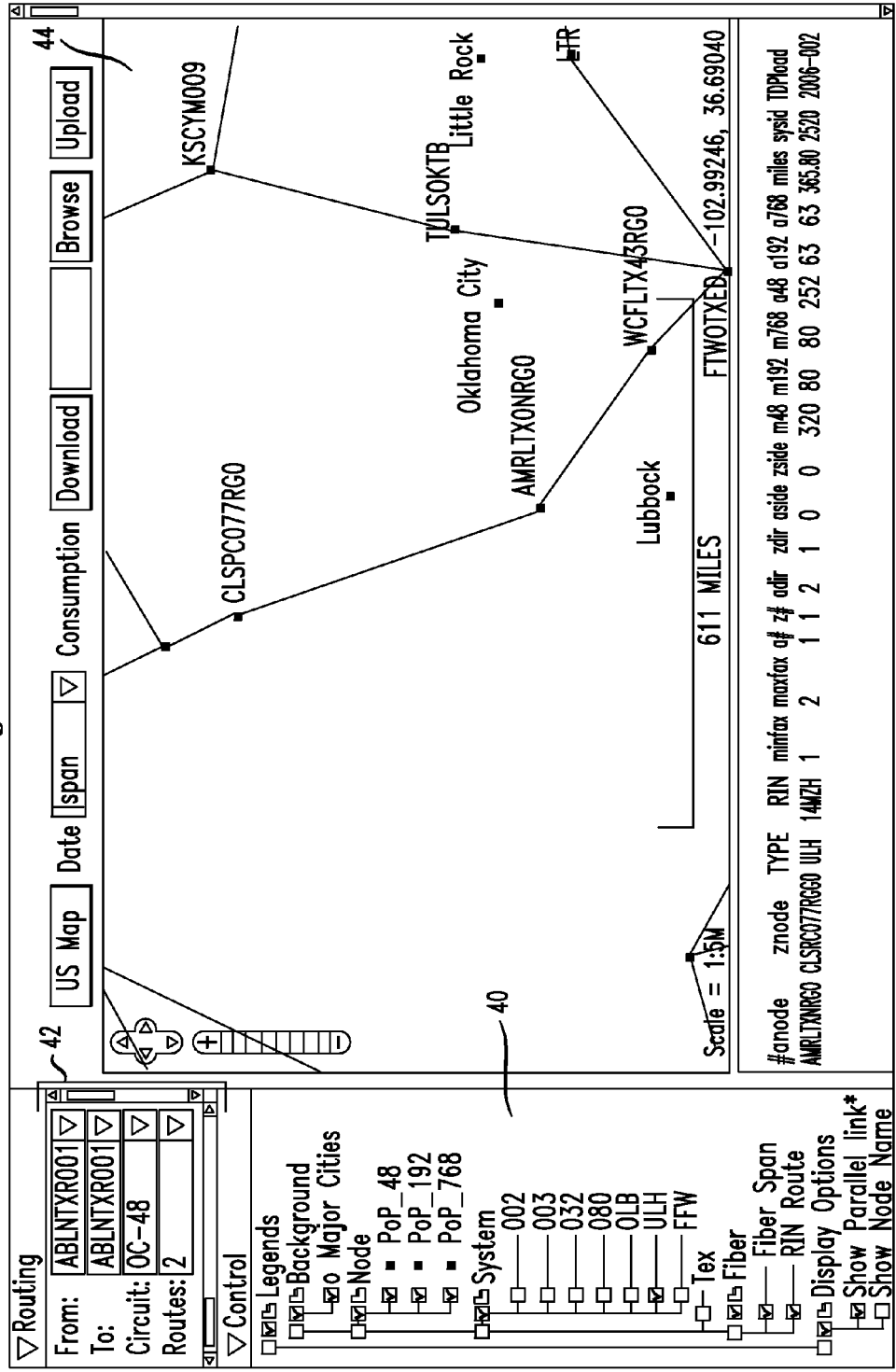

Based on the present disclosure, one could build a routing tool over multiple DWDM subsystems to achieve following objectives: (1) user friendly network visualization, (2) analysis of existing network capacity usage and shortages analysis, (3) cost-efficient circuit routing for existing and planned DWDM networks, (4) data importing/exporting, and (5) usable reports. The tool eases capacity analysis and circuit routing of sophisticated core DWDM networks having multiple vendor subnetwork types including legacy point-to-point DWDM networks, ultra long haul (ULH) networks, and regional DWDM networks. FIG. 1 shows a high-level block diagram of a tool 10 including the graphical user interface (GUI) 12. The GUI 12 accepts inputs from the user and shows information the user needs. The GUI 12 supports multiple users simultaneously, and has four components, which include a menu, control panel, map panel, and information panel. The main functions of the GUI 12 include displaying network topology, optimized routes, and the status of link capacity utilization (exhaustion). As shown in FIG. 1, the tool gathers input files from multiple resources, such as facility planner databases 14, vendor tools 16, and local configuration files 18.

As an overview of DWDM planning procedure, the tool first collects data, such as network information, network status, domain reachability matrices, and DWDM system roll timestamp information. The tool then provides a visual representation of multi-layer topology at the different signal rate-layers, plus fiber-span layer, DWDM link capacity usage, and hot spot analysis, where the DWDM links have low capacity. Third, the tool provides end-to-end (multi-domain) optimization of new circuit routes. Lastly, the tool provides routing visualization by showing end-to-end routes over the network map with cost and mileage information, the DWDM section-by-section with regenerator locations, and the DWDM section wavelength.

The features of the tool include network visualization, routing (such as network state display, minimum cost/minimum distance routing, choice of paths, including/excluding certain sites), and DWDM consumption analysis (such as estimating exhaust date and displaying hot spots).

The tool provides the GUI for visualization of network elements, capacity usage, and circuit routing by displaying the network topology. In addition, the GUI interacts with the planner in meaningful ways by requesting routing and display of optimized routes, and displaying capacity queries and DWDM metrics. FIGS. 2A-F are screenshots of the GUI showing various scales. The GUI includes a selection field 40, in which the user or planner is able to select features associated with the display, such as whether to display major cities, different vendor system combinations and specific type of nodes that represent the ability for circuits/signals to originate or terminate at various signal rates (e.g., SONET OC-48, 10 Gigabit Ethernet, etc). The GUI also includes a specification field 42, in which the user is able to enter the source and destination of the intended route, the type of system to be routed, and the number of routes to be made. A display field 44 of the GUI provides a display of the network routes overlayed on a geographical map in accordance with a specified mileage scale.

Vendor subsystems have a common function, that is, whether a path inside the subsystem is reachable or not. Thus, it is possible for each subsystem vendor to provide a reachability matrix for its subsystem domain, which is essentially a list of all possible reachable paths inside the subsystem. Thereafter, the reachability matrices can be used as the glue to combine multiple domains together and route a circuit over multi-domain DWDM networks efficiently.

Currently, most ROADM-based systems support 10 Gb/s or 40 Gb/s per wavelength. However, a large portion of connections are still provisioned using lower speeds, such as 2.5 Gb/s or 10 Gb/s. More recent ROADM systems provide demultiplexing capabilities, in which a single wavelength can be demultiplexed into n sub-channels of lower rates, where each sub-channel occupies 1/n of the total wavelength capacity. For example, one 10 Gb/s wavelength path may include four 2.5G sub-channels, and one 40G wavelength path may be demultiplexed into four 10 Gb/s sub-channels. A higher speed wavelength lightpath with demultiplexing capability is referred to herein as a multiplex link.

In DWDM systems, optical signals are transmitted over fibers. Multiple fibers are combined together and deployed over a common conduit. The fiber conduits form a fiber map. In the fiber map, ROADM sites and fiber joints are fiber nodes, in which fiber joints are fiber branch locations. The fiber segments between two neighbor fiber nodes are referred to herein as fiber spans. DWDM systems are built upon fiber spans. In DWDM systems, the traffic add/drop/express-through sites are referred to herein as DWDM nodes. Fiber span connections between two DWDM nodes are referred to herein as DWDM links. Thus, optical networks can be decomposed into four layers: 1) a fiber span layer, 2) a DWDM link layer, 3) an express link layer, and 4) a multiplexing link layer.

Due to fiber availability and traffic changes, carriers may reroute some DWDM systems from existing fibers to new fibers, which is referred to herein as a DWDM system roll. During DWDM system roll, there are time gaps between planning and circuit provisioning. Thus, it would be advantageous if the planning tool would be able to support DWDM system roll for deployed subsystems. The planning tool should also allow any subnet(s) or section(s) within a subnet to be rolled (reassigned) to new fibers, new routes, and even new site locations. In some cases, the roll is given a unique project name with a project due date. The types of operations that can be performed during a DWDM system roll include: (1) fiber changes that could require a Dispersion Compensation Module (DCM); (2) fiber changes that could require amplifier modifications; (3) inserting or removing an Intermediate Light Amplification or Injection Locked Amplifier (ILA); (4) upgrading a pass-through site (bypass); (5) removing a site (which may be a non-equipment or equipment site); and (6) rerouting a fiber (ROADM end sites remain the same but intermediate sites may change).

In accordance with the present disclosure, an architecture solution is provided concerning how to route a circuit over a heterogeneous core DWDM network having multi-vendor environments efficiently, including building blocks, data flow, reachability matrix generation, DWDM system roll, cost model graph generation, DWDM sub-network selection, regenerator location selection, and wavelength assignment.

As indicated above, a large carrier's DWDM network includes multiple DWDM sub-networks, including legacy point-to-point DWDM systems, early stage optical add/drop multiplexing systems, and modern reconfigurable add/drop multiplexing systems. During a circuit planning process, it is often difficult for a planner to know the entire system topology and available capacity. Thus, the GUI in accordance with the present disclosure enables visualization of the entire network including all sub-networks in a single display showing capacity usage and shortage analysis. This network visualization includes zoom-in/zoom-out capability and can show a subset of sub-networks. The GUI also shows the fiber span layer with mappings from the DWDM link to a sequence of fiber spans. When a planner inputs source, destination, and bandwidth requirements, the set of routing platforms (the set subsystems could be considered) to the GUI, the GUI is able to find one or more cost-efficient routes in response to the request, including which sub-networks are selected, where to place regenerators, and what the wavelength for each link is, as well as highlighting the route on the GUI and textual report.

Network planners interact with the GUI, which is able to accept inputs and return relevant information in response thereto. The GUI is also able to support multiple planners or users simultaneously. The main functions of the GUI include displaying network topology, optimized routes, and the status of link capacity utilization (or hot spot analysis).

FIG. 1 shows system architecture of a tool 10 including data flow. Network status or model files 46 maintain information for each DWDM link including fiber information, distance, total capacity, available capacity, specific wavelength status, and node location, such as latitude and longitude. Local configuration files 18 maintain optical transponder cost, regenerator cost, multiplex terminal cost, and multiplex capability for the sub-networks. There are additional constraints in the local configuration files 18, such as that a sub-network has special constraints on wavelength assignment, a location has space/electricity constraints concerning the regenerator, and the like.

The vendor's planning tool 16 provides functionality to decide whether a path in its sub-network is reachable or not. The tool 10 preprocesses these data sources to generate network model files, including the DWDM node file, DWDM link file, DWDM express link file, DWDM multiplex link file, and the DWDM fiberspan file, which will be used by the GUI 12 to provide visualization of network topology and usage information, and by a routing engine 48 to route planner requests efficiently over the multi-vendor sub-network environment. The preprocess step filters out most of the data errors and generates express links, multiplexing links, and fiber span mappings to DWDM links. The routing engine 48 obtains input from the network model files 46 and user routing requests through a GUI interface, and generates output to GUI files 48 in order to provide the display. The GUI 12 reads inputs from GUI files 48 for network visualization and capacity analysis, and interacts with the user to obtain user requests. After the routing engine 48 generates the routes, the GUI 12 reads the routes and displays them for review by the planner or user. After the user confirms the route, the GUI outputs the detailed route to other systems for field provisioning.

Regarding reachability matrices, previous research on optical routing primarily assumes a homogeneous optical network. Vendor-supported planning and design tools also assume homogeneous optical networks and consider only the vendor's products. The routing and provisioning process in a larger carrier's core DWDM network is quite different. To route circuits across multiple subsystems efficiently, each subsystem vendor is asked to provide a reachability matrix that lists all possible reachable paths inside their subsystem. One method to generate the reachability matrix is described below. This method assumes that the vendor planning tool is able to determine whether a given path is reachable or not. If path p is reachable, function ReachablePath(p) returns a "1", otherwise this function returns a "0".

Given a subnetwork G(V,E) and parameter k;

for any two node pair (u,v)∈V, find k shortest paths $p_1, \ldots p_k$ between u and v; and for each i from 1 to k, if reachablepath($p_i$) returns 1, report path $p_i$.

All reported paths are reachable paths.

k may be adjusted such that increasing k will not change the report output.

Assuming each DWDM section deployment has one project name (an ID for the section), a suggested reachability report output would be as follows: ReachablePathID, SiteAName, SiteZName, ProjectName. The ProjectName is used to identify parallel sections between two nodes of the same sub-network.

For example, a reachability matrix for a 5-node linear chain B-C-D-E-F with 5 reachable routes B-C-D, B-C-D-E, C-D-E, C-D-E-F, D-E-F, excluding the one-hop paths, is as follows. The term "matrix" is used because this could be described in matrix form, where the (i,j) term of the n×n matrix represents the sections between n nodes. For example, in the 5×5 matrix of the previous example, the element (2,5) (i.e., C to F) is a pointer to the 3-hop route.

1, B, C, projectBC
1, C, D, projectCD
2, C, D, projectCD
2, D, E, projectDE
2, E, F, projectEF
3, C, D, projectCD
3, D, E, projectDE
4, C, D, projectCD
4, D, E, projectDE
4, E, F, projectEF
5, D, E, projectDE
5, E, F, projectEF As another example, the (1,5) matrix term=0 (null pointer) because the pair {B,F} is not reachable.

From the above reachability matrix example, there are a total of 5 reachable paths and each reachable path has one unique ReachablePathID: the first path is from node B to node C to node D; the second path is from node C to node D to node E to node F; the third path is from node C to node D to node E; the fourth path is from node C to node E to node F; the fifth path is from node D to node E to node F.

In some subsystems, if one path is reachable, then all sub-paths are reachable. In this case, the reachability matrix can report the longest reachable paths. In the above example, reachable path ID=2 and ID=4 are enough. However, in other subsystems, if one path is reachable, its sub-paths may not be reachable. In this case, the reachability matrix should report all possible reachable paths.

Regarding DWDM system roll, in a deployed subsystem, some subnets, sections, or spans will need to be changed to other fiber routes, which is referred to as DWDM system roll. DWDM system roll is different from subsystem expending, or subsystem augmenting. In a DWDM system roll project, a carrier planner first identifies a subnet from ROADM A to ROADM Z along path P, wherein each DWDM section along path P has a project ID. Due to fiber availability and/or traffic changes, the carrier planner identifies another path Q from ROADM A to ROADM Z and assigns a new project ID to each DWDM section along the path Q. Then, the carrier plans a roll of path P to path Q on a future date, which is referred to as a roll date. For a circuit route passing ROADM A to ROADM Z, if the effective date is before the roll date, the circuit should route over path P; if its effective date is after the roll date, the circuit should route over path Q. On the roll date, all circuits routed over path P will be switched to path Q. Currently, this is no solution to deal with such a situation. In this disclosure, a timestamp solution is described. In the timestamp solution, two separate fields are attached to each DWDM section (ROADM to ROADM section) as timestamps: 1) "Effective Date" and 2) "Terminate Date". The "Effective Date" for a roll project (new design) refers to the date a particular project will take effect. The "Terminate Date" for an existing project (deployed or to be rolled design) refers to the date on which a particular project will be terminated. Unless specified, an empty "Effective Date" field is interpreted as negative infinity, and an empty Terminate Date is interpreted as infinity. The In Effect date and Terminate date may be changed at any time in accordance with planning changes. Vendor planning tool users are able to enter DWDM system roll projects in accordance with the following suggested steps:

1. obtaining a "To be rolled" project;
2. entering a new design with a new project ID;
3. entering a roll date; and
4. confirming the roll project (wherein the new design replaces the existing design on the roll date).

The vendor planning tool automatically changes the roll date to be the terminate date of a "to be rolled" project, and changes the roll date to be the effective date of a new design project. Then, the two timestamps trigger automatic "Effective" and "Terminate" transitions in the network topology according to the user-specified roll date. More than one roll may be in progress at a given time, but each will have its own roll date. As time proceeds, the current network snapshot, in which the DWDM section terminate date is after the current date and the effective date is before the current date, becomes the past network snapshot. Specific details of the past should be retained for historical tracking.

For the reachability matrix due to DWDM system roll, the reachability matrix may be generated according to DWDM section topology without considering the effective date and the terminate date. However, a separate section report is generated in parallel from the vendor planning tool. The section report is a list of all ROADM-ROADM sections (existing and roll/planned) with effective date timestamps and terminate date timestamps plus project IDs. In this case, the reachability matrix is a superset of all reachable regenerator free paths with no time differentiation. The carrier heterogeneous planning tool may use the section report to process roll related network topology and generate timestamp supported reachability matrices.

Figure 3:
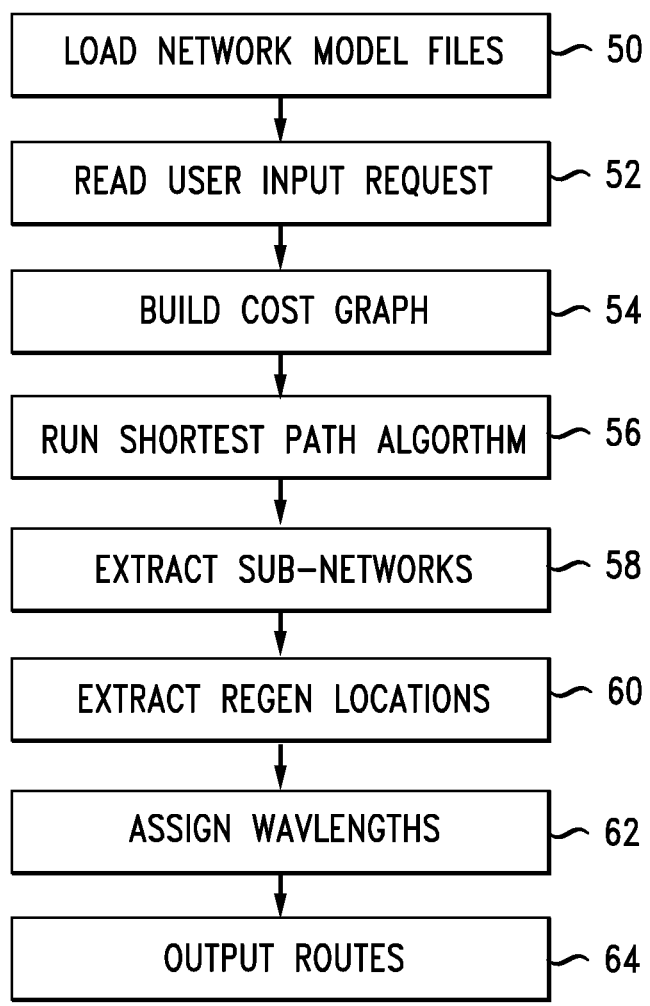
FIG. 3 is a flowchart of a routing engine method in accordance with the present disclosure.

Using the timestamp supported reachability matrices for each subsystem, the carrier heterogeneous planning tool is able to provide date bounded network topology and circuit routing concerning DWDM system roll projects. For example, a DWDM system roll from A-B-C to A-D-C in one subsystem is as follows:

A user has a roll planned on Feb. 1, 2011
Topology A-B-C rolls to topology A-D-C
Today is Jan. 22, 2011 and a user routes a circuit with a customer request due date of Jan. 29, 2011
The planning tool will use topology A-B-C
Today is Jan. 22, 2011 and an user routes another circuit with customer request due date Feb. 15, 2011
The planning Tool will use topology A-D-C FIG. 3 is a flowchart of the routing engine procedure. If the user inputs a routing request on the GUI, the GUI forwards the request to the routing engine to find an efficient solution. Then, the routing engine loads the network model files 50 generated by a preprocessing module excluding those links not satisfying the user's requirements. For example, if the user requests 52 a 10 Gb/s connection, all sections supporting only 2.5G connections are excluded; if the user requests a 2.5G connection, all sections supporting only 10 Gb/s and 40 Gb/s are excluded. With this information, the routing engine generates the cost graph model 54 with appropriate weights associated with graph edges. Next, a shortest path algorithm is applied to the cost graph model 56 to find a shortest path from the source to the destination. Based on the selected path, the routing engine is able to extract the sub-networks 58 on the path and the regenerator location 60. For each link on the selected sub-network along the selected path, a first-fit or other sub-network constraint wavelength assignment policy is used to assign a wavelength 62 to each link or express link along the selected path. Finally, the output is returned to the GUI 64 for display to and confirmation by the user.

In one embodiment, the present disclosure is a method and apparatus of a heterogenous planning graph model for recommending a route to support a connection between termination points, that is, between two network offices. As discussed above, it is the carrier's duty to optimize its transport network to save cost while providing a high level of network availability to meet a request of a user.

Figure 4:
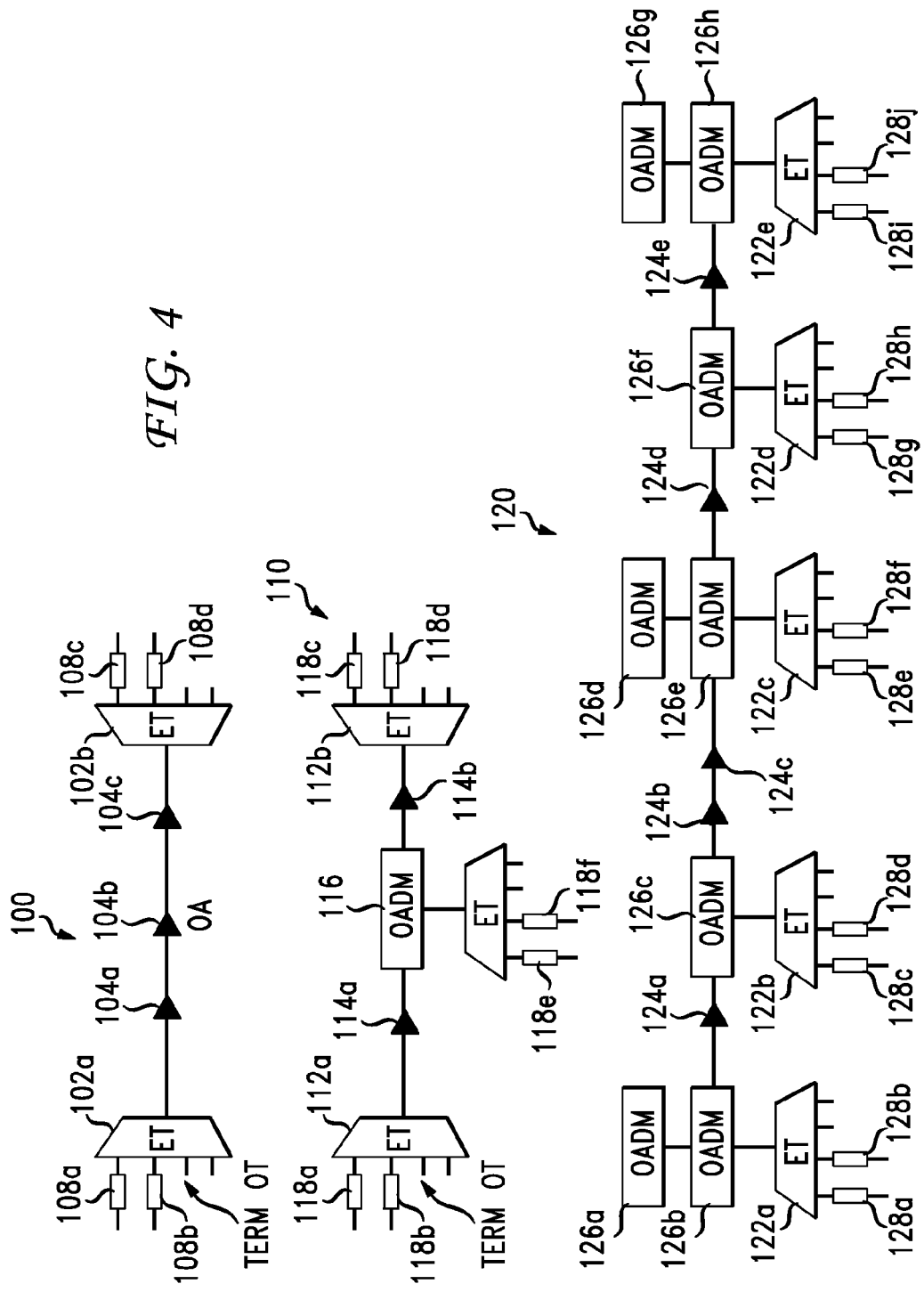
FIG. 4 is a block diagram showing a plurality of different types of subnetworks.

As discussed above, a carrier or service provider may have many sub-networks. For example, FIG. 4 is a block diagram showing different types of sub-networks 100, 110, and 120. Although only three types of sub-network are illustrated, the present disclosure is not so limited. Namely, other type of subnetwork may exist and are within the scope of the present disclosure.

Figure 5:
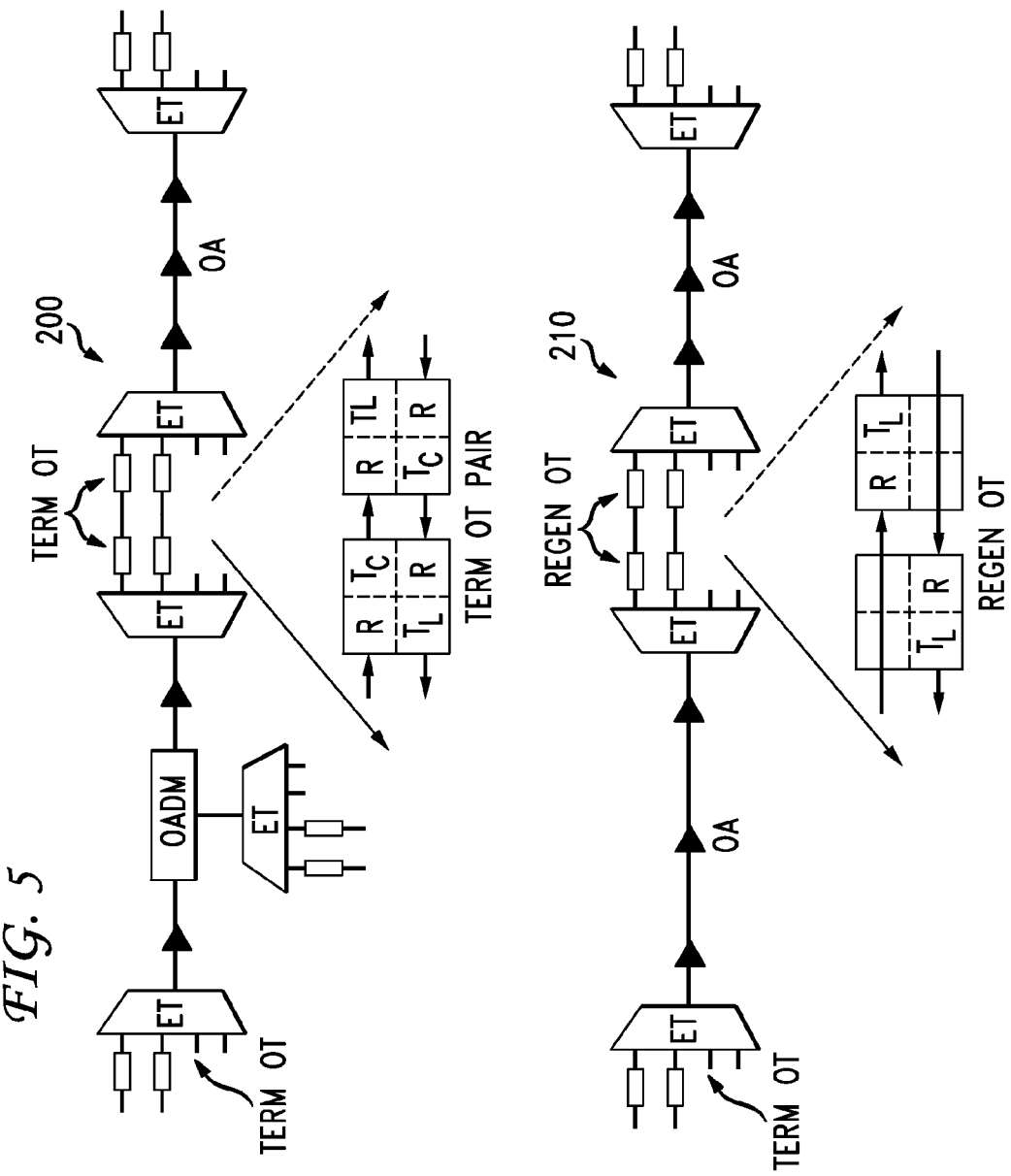
FIG. 5 is a block diagram showing a plurality of different types of optical transponders that are used to connect different types of subnetworks.

Different sub-networks may have different technologies and they can be deployed using equipment from different vendors. Different sub-networks may or may not be located at the same locations. FIG. 5 shows three illustrative types of DWDM sub-networks. Where "ET" refers to an end terminal (e.g., 102a, 102b, 112a, 112b, 122a, 122b, 122c, 122d, and 122e), "OA" refers to an optical amplifier (e.g., 104a, 104b, 104c, 114a, 114b, 124a, 124b, 124c, 124d, 124e), "OADM" refers to an optical add/drop multiplexer (e.g., 116, 126a, 126b, 126c, 126d, 126e, 126f, 126g, and 126h, and "OT" refers to an optical transponder that is an optical-electrical-optical device (e.g., 108a, 108b, 108c, 108d, 118a, 118b, 118c, 118d, 118e, 118f, 128a, 128b, 128c, 128d, 128e, 128f, 128g, 128h, 128i, and 128j). Subnetwork 100 is a point-to-point DWDM subnetwork with two end terminals. It should be noted that there is no express traffic across these sub-networks, where express traffic refers to an optical signal traveling more than one optical link without regeneration.

In one embodiment, subnetwork 110 is an optical add-drop multiplexer (OADM) subnetwork, where an optical signal can pass through multiple OADMs without regeneration and traffic can be added or dropped at any OADM location. Sub-network 120 is a multi-degree ROADM-based DWDM sub-network, where the optical signal can travel from one location to any other location as long as the same wavelength is available in the route links. As long as the traveling distance is in the range of the reach limitation, no regeneration is required in the middle of the subnetwork. In other words, regeneration is only needed when the distance exceeds the reach limitation. Such a regeneration device is referred as a regenerator. In FIG. 4, ET, OA, and OADM are pre-installed shared equipments, while OTs and regenerators are installed when a circuit is activated.

In one embodiment, when a circuit travels across more than one sub-network, optical transponders (OT) are needed. If two adjacent sub-networks use different technologies, a back-to-back "term OT" pair is required. FIG. 5 is a block diagram illustrating a plurality of different types of optical transponders 200 and 210 that are used to connect different types of sub-networks.

When two adjacent sub-networks use the same technology, that is, from the same vendor, a simpler "regenOT" (also called regenerator) 210 is sufficient. Often, the cost of one regenerator 210 is cheaper than the total cost of two "term OTs" 200 for the same technology. When a closer look is taken at the "term OT" pair and "regenOT", it is generally the case that the "regenOT" could save two receivers and two client transmitter components, which will make a single "regenOT" cheaper than two "term OTs" of the same technology. Thus, during circuit routing in a heterogeneous transport network, it is preferable to route the circuit (broadly a connection) over the same type of sub-network as much as possible to save optical transponder cost since optical transponders are expensive devices and a majority of the capital cost.

After a route is determined for a circuit, engineers are dispatched to different offices to establish the circuit using inventory optical transponders. Since most circuits will last for a long time, such work overhead is acceptable. Inside a carrier's network footprint, an office may have many end terminal devices for different sub-networks. With clear identification, an engineer can easily establish a circuit connecting two ETs inside each office via OT/regenerators.

If one sub-network has pre-installed OT/regenerators, and the sub-network management system is able to select and/or connect OT/regenerators automatically, there is no need to dispatch an engineer to the offices. The planning tool should inform the sub-network management system on the path selection of the two offices crossing the sub-network. The sub-network management system can establish the circuit inside the sub-network automatically.

Figure 6:
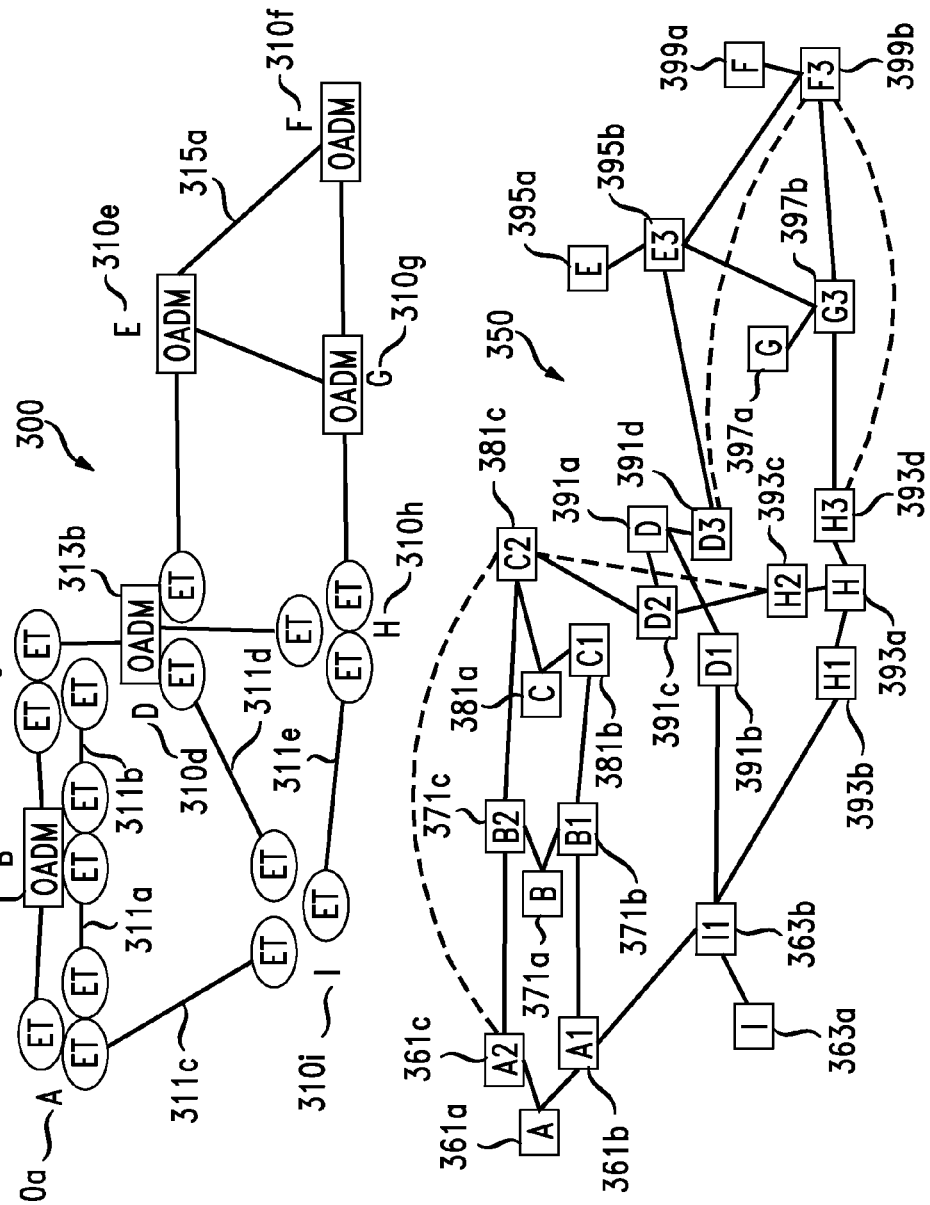
FIG. 6 is a block diagram showing an illustrative network topology graph or information and its associated network cost graph or information.

FIG. 6 is a block diagram illustrating an illustrative network topology graph or information 300 and its associated network cost graph 350 or information (broadly a cost model). The network topology graph provides a graphical representation of network offices, nodes, or termination points and the links connecting the network offices. It should be noted that a connection over the heterogeneous DWDM network can be routed over multiple sub-networks and may require several OTs to connect them.

In one embodiment, the present disclosure only considers the costs of optical transponders required to establish the connection, for example, the "term OT", and "regenOT" costs. However, the present disclosure is not so limited and other costs can be considered in conjunction with the costs of the optical transponders. In one embodiment, in order to find the most cost-efficient routes for connections considering both "term OT" and "regenOT", the method creates a network cost graph for a given network state. The route for a connection request is computed based on the network cost graph.

In one embodiment, G(V,E) is used to denote a given network state, where V refers to the network offices and E refers to the network links including system links and express links, where an express link refers to a regeneration-free route. G'(V',E') is used to refer to the corresponding network cost graph, where V' is the vertex set and E' is the edge set. In one embodiment, inside each network office, there may be many different types of sub-networks terminating at this office. Then, for each office i in G, corresponding Ni+1 vertices are created in G' assuming there are Ni sub-network types terminating at office i, where one vertex is for traffic termination and Ni vertices for the Ni sub-network types. Thus, there is a total of $\Sigma i$ (Ni+1) vertices in G'.

Next, edges are created among the Ni+1 vertices for G'. From the traffic termination vertex, one edge is made to each of the Ni sub-network type vertices with (termOT_cost–regenOT_cost/2) of the corresponding sub-network type. Since half of the "regenOT" cost should not be more expensive than one "termOT" cost of the same sub-network type, this relationship should not produce a negative value. For any link of E with an available capacity, one can first identify the specific sub-network type and its two end offices. Then one can locate the corresponding two vertices and create one edge between them with the cost of one "regenOT." Then, there is a total $\Sigma i$ Ni+|E| edges, where |E| means the total number of links in G, including DWDM system links and express links. It can be verified that a connection route from one traffic termination vertex to another traffic termination vertex will have the corresponding optical transponder cost.

FIG. 6 shows one illustrative example of a network topology graph 300 and its associated network cost graph 350. It should be noted that network topology graph 300 is only illustrative and should not be interpreted as a limitation to the present disclosure.

For example, in the network topology graph 300, there are nine (9) network offices (broadly also referred to as nodes) named from A to I (310a-310i), and there are 3 types of DWDM systems or subnetworks: the first type comprises point-to-point DWDM systems, e.g., A-B (311a), B-C (311b), A-I (311c), I-D (311d), and I-H (311e) supporting 2.5G per wavelength; the second type comprises degree-2 OADM systems, A-B-C (313a) and C-D-H (313b) supporting both 2.4G and 10 Gb/s per wavelength without multiplexing capability; the third type comprises multi-degree OADM systems, H-G-F-E-D-G (315a) supporting both 10 Gb/s and 40 Gb/s per wavelength with multiplexing capability. In one embodiment, for the third multi-degree OADM system, due to optical reachability constraints, it is assumed that there are only two express links H-G-F and D-E-F but there are nine potential multiplex links.

For a user request <A, F, 2, 5G>, the cost graph is generated as follows: as follows: although type III does not support 2.5 Gb/s connections per wavelength, it provides a multiplex link to support 2.5 Gb/s connections. In one embodiment, referring to the network cost graph 350, since node A has two sub-network types, type1 and type2, three (3) vertices, A (361a), A1 (361b), and A2 (361c) are created, while node B only has two sub-network types terminating here, three (3) vertices, B (371a), B1 (371b), B2 (371c) are created for node B. Since Node C has two sub-network types, three (3) vertices C (381a), C1 (381b), and C2 (381c) are created. Although Node I has three terminating subnetworks, each of the sub-networks is of the same subnetwork type. Thus, only two vertices I (363a) and I1 (363b) are created. Similarly, both node D and node H have all three sub-network types while each of nodes E, F, G only has sub-network type 3 terminating there. Thus, four (4) vertices D (391a), D1 (391b), D2 (391c) and D3 (391d), and H (393a), H1 (393b), H2 (393c) and H3 (393d) are created for nodes D, and H, respectively. Similarly, two (2) vertices E (395a), E3 (395b), and F (397a), F3 (397b), and G (399a), G3 (399b), are created for nodes E, F and G, respectively.

An example as to how a cost can be computed for a route using the network cost graph 350 will now be described. Suppose a connection from node A to node F through nodes B, C, D, E is contemplated or requested. The total OT cost would include 2 "TermOT" of type2, one "regenOT" of type2, 2 "TermOT" of type3. From the network cost graph 350, it can be seen that the edge AA2 has the cost of (termOT_cost–regenOT_cost/2) of type2, edge A2C2 has the cost of one regenOT of type2, edge C2D2 has the cost of one regenOT of type2, edge DD2 has the cost of (termOT_cost-regenOT_cost/2) of type2, edge DD3 has the cost of (termOT_cost-regenOT_cost/2) of type3, edge D3F3 has the cost of one regenOT of type3, and edge F3F has the cost of (termOT_cost-regenOT_cost/2) of type3. Summing these costs together, one arrives at the final cost of 2 termOT of type2, plus 1 regenOT of type2, and plus 2 termOT of type3. It should be noted that although not specifically specified in the present disclosure, the termOT_cost and regenOT_cost are real costs representing the actual cost of these OTs. It should also be noted that in one embodiment the termOT_cost and regenOT_cost comprise the actual purchase costs, but it may optionally include other costs, e.g., the installation cost for installing the OTs, the transportation or shipping costs for the OTs, and the like.

Further, assume the shortest path from A to F on the cost graph is A→A2→C2→D2→D→D3→F3→F. Then, the path cost would be (TermOT_type2–regenOT_type2/2)+(regenOT_type2)+(regenOT_type2)+(TermOT_type2–regenOT_type2/2)+0+multiplexcost_DF+0=2*TermOT_type2+regen_type2+multiplexcost_DF. One type2 regenerator is required at location node C, and a multiplexing link is needed between D and F over sub-network type 3. For each intercity link along the selected path, we may either apply the sub-network constraint policy wavelength assignment, such as first-fit policy, that is, order the wavelengths from low frequency to high frequency and assign the first available wavelength from low to high order.

It should be noted that in the example above, one may account for all the equipment cost including the termOT and regenOT. In one embodiment, carriers may also consider shared common cost, which can be calculated as mileage of the inter-city link times per-wavelength-mile common cost. Thus, in the network cost graph 350, shared common cost can be added to the cost of the inter-city links.

Using the auxiliary graph shown in FIG. 6, the roll project issue can be avoided by using the timestamp solution to determine the correct sub-networks, correct location for regenerators, correct multiplexing links, and correct wavelength assignments.

Figure 7:
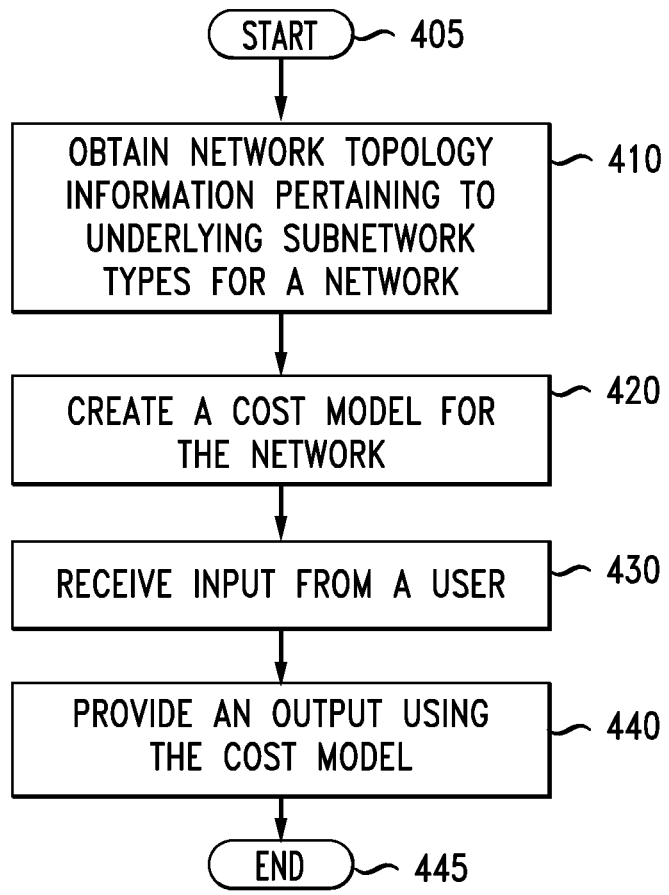
FIG. 7 is a flowchart showing one embodiment of a method for providing a route recommendation.
Figure 9:
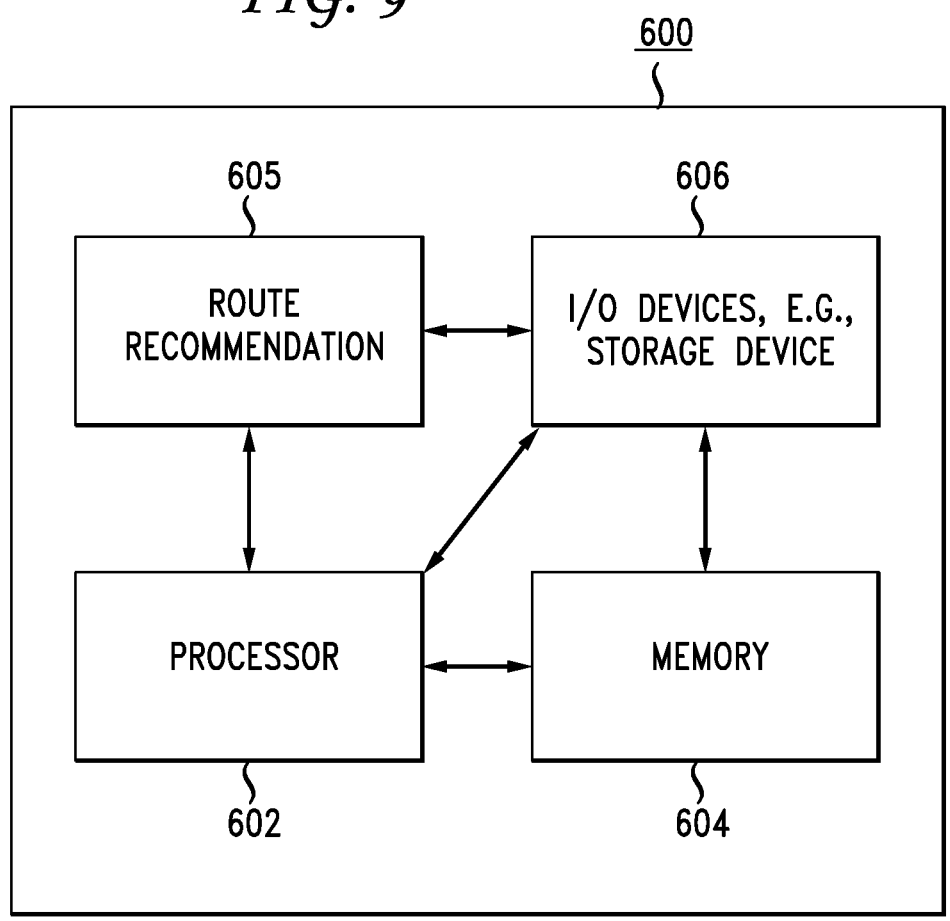
FIG. 9 is a high-level block diagram of a first implementation of the route recommendation method implemented using a processing device.

FIG. 7 is a flow diagram illustrating one embodiment of a method 400 for providing a route recommendation. The method 400 may be implemented, for example, in a general purpose computing or processing device or an application server as illustrated in FIG. 9 below. The general purpose computing device or the application server can be a standalone device or it can be a device that is accessible via a communication network.

The method 400 is initialized at step 405 and proceeds to step 410, where network topology information pertaining to the underlying subnetwork types for a network is obtained, for example, from a database.

In step 420, method 400 creates a network cost graph (broadly a cost model) as discussed above for the network. In one embodiment, any one of the above discussed multiplexing policies can be implemented with the network cost graph.

In step 430, once the network cost graph has been created for a network, it can be used to provide a route recommendation based upon received inputs. For example, in step 430, method 400 receives inputs from a user. The input may comprise a starting node, an ending node and a bandwidth requirement that will be need for a connection or circuit connecting the starting node and the ending node. Broadly, method 400 may receive a request from a user for a connection to be supported by the network. For example, a user may provide the input of needing a connection between New York City and San Francisco with a bandwidth requirement of 2.5 Gb/s.

In step 440, method 400 provides an output using the network cost graph that will provide one or more route recommendations. Broadly, method 400 provides at least one route recommendation for supporting a requested connection by applying the cost model. For example, method 400 may recommend a route that traverses from New York City to Chicago and then to San Francisco. This route recommendation may incur the least cost to the carrier operating the underlying network. In one embodiment, method 400 may provide a plurality of route recommendations in an order of increasing costs. For example, method 400 may recommend a route that traverses from New York City to Atlanta and then to San Francisco. Although this route recommendation may in fact be the lowest cost, the user may want to see other route recommendations to ensure that other parameters are considered. For example, the capacity in the route between New York City and Atlanta can be reserved for other future uses and a more direct route (possibly at a slightly higher cost) may be more appropriate to satisfy the requested connection. The method 400 then terminates in step 445.

It should be noted that although not explicitly specified, one or more steps of the method 400 described above may include a storing, displaying and/or outputting step as required for a particular application. In other words, any data, records, fields, and/or intermediate results discussed in the method can be stored, displayed, and/or outputted to another device as required for a particular application or for a particular device.

Figure 8:
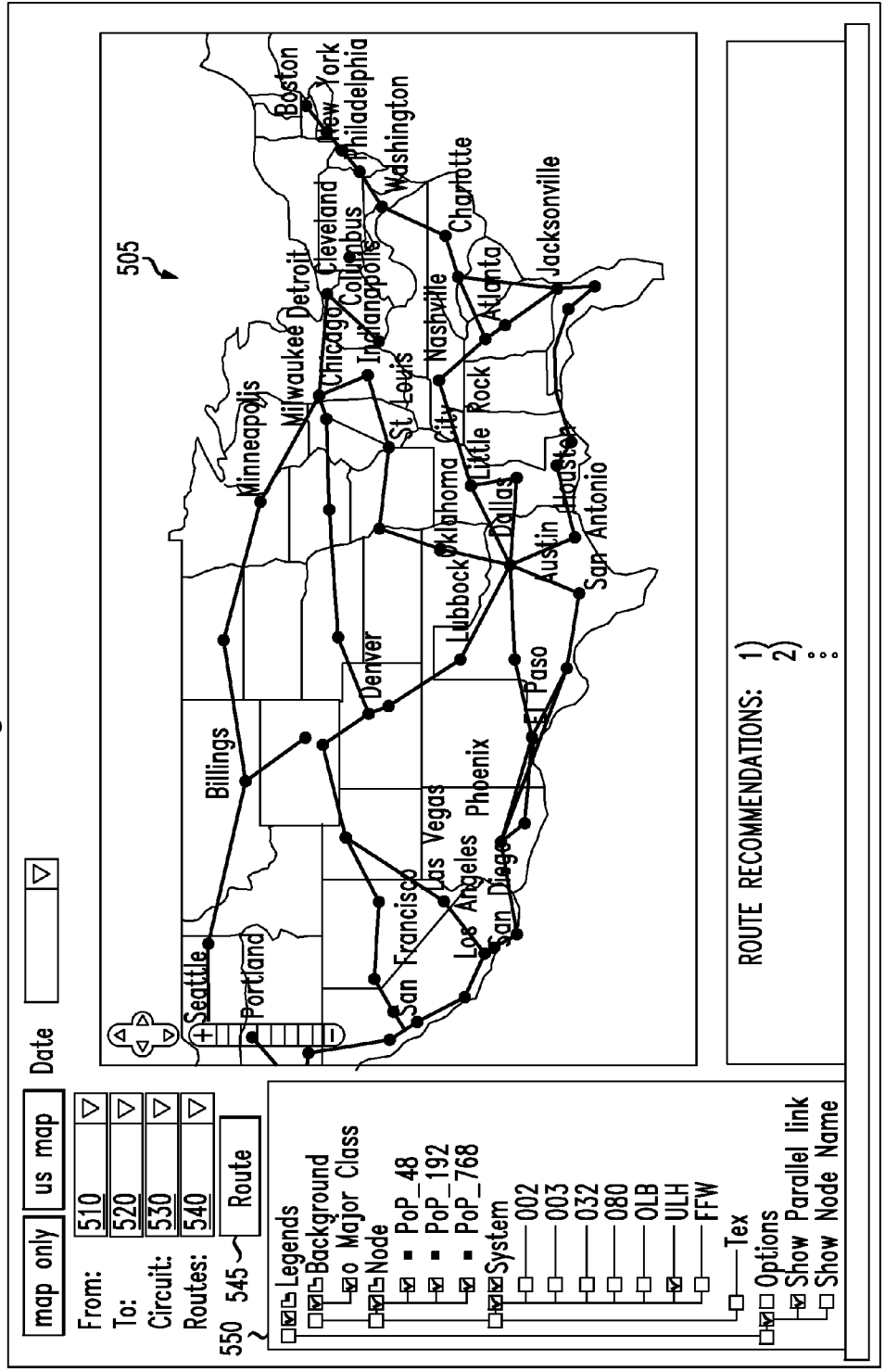
FIG. 8 is a Graphical User Interface (GUI) implemented in accordance with the present disclosure.

FIG. 8 is an illustrative user interface 500 implemented via a display screen.

In one embodiment, the user interface 500 provides a number of input fields 510, 520, 530, 540 and 550. For example, input field 510 allows a user to input a starting node, whereas input field 520 allows a user to input an ending node. Input field 530 allows a user to input a bandwidth or capacity requirement, e.g., 2.5 Gb/s, OC48, and so on. Input field 540 allows a user to input the number of route recommendations that the user wants the tool to provide, e.g., 10 route recommendations and so on. Input field 550 allows a user to input various additional information that the user may want to see in the display area 505. In this illustrative example, the map of the United States is displayed along with major cities, links, and so on. It should be noted that any number of network parameters can be displayed depending on the requirements of a specific implementation. A button 545 is provided for the user to start the process of providing one or more route recommendations once all of the inputs are provided. Finally, the user interface 500 provides an area 560 to display the route recommendations. The route recommendations can be displayed in any number of formats, e.g., the nodes that are traversed, the cities that are traversed, the node identifications, the overall cost for each route recommendation, and so on. In one embodiment, each route recommendation is graphically presented on the display area 505. For example, different colors can be used to represent different costs of the route recommendations, e.g., lower cost route recommendations are colored in green and higher cost route recommendations are colored in red. It should be noted that the present disclosure is not limited in any way by this illustrative example of the user interface 500.

FIG. 9 is a high level block diagram of a route recommendation method that is implemented using a general purpose computing device 600. The general purpose computing device 600 may be part of a network device or a standalone device. In one embodiment, the general purpose computing device 600 comprises a processor 602, memory 604, a route recommendation module 605 and various input/output (I/O) devices 606 such as a display, keyboard, mouse, modem, stylus, joystick, keypad, controller, network interface, and the like. In one embodiment, at least one I/O device is a storage device (e.g., a disk drive, optical disk drive, floppy disk drive). It should be understood that the route recommendation module 605 can be implemented as a physical device or subsystem that is coupled to a processor through a communication channel.

Alternatively, the route recommendation module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the route recommendation module 605 described herein with reference to the preceding figures can be stored on a non-transitory computer-readable storage medium or computer-readable device (e.g., RAM, magnetic or optical drive or diskette, and the like).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

A carrier core DWDM routing tool having a graphic user interface was implemented using the disclosed method. This tool is able to show the current network status for all DWDM systems with timestamp date bounding. With information on the embedded physical layer (fiber-span) and DWDM system capacity assumption, the tool can also show corresponding fiber-span routing so that the shared risks of the existing connections and the hot-spots of core DWDM network can be determined. When a planner inputs two end offices with the required capacity and other constraints, the tool can automatically compute and show several cost-effective candidate routes over the heterogeneous sub-networks, including detailed information regarding OTs, regenerator locations, and wavelength assignments. This tool enables planners to make more informative and intelligent decisions and saves significant capital cost of the carrier.

Thus, the present disclosure provides a solution for routing a connection over multiple-vendor DWDM networks efficiently, that is, which vendor subsystem to select, where to place regenerators in each vendor subsystem, where to place optical transponders to connect two vendor subsystems, and which wavelength to select for each DWDM link such that the total cost is minimized.

Figure 10:
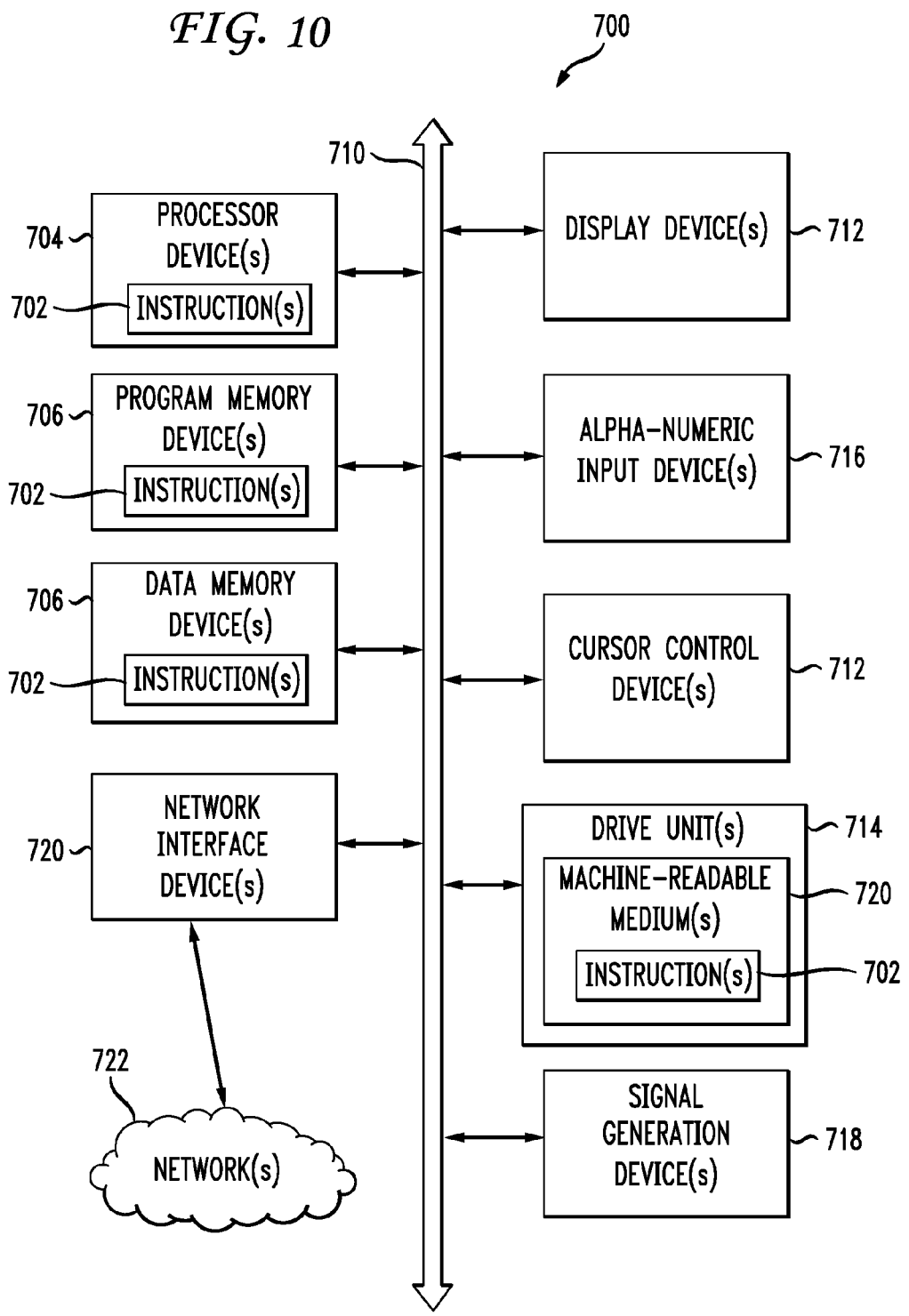
FIG. 10 is a high-level block diagram of a second implementation of the disclosed method using a processing device.

FIG. 10 is a block diagram of an embodiment of a machine in the form of a computing system 700, within which a set of instructions 702, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a Personal Digital Assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 700 may include a processing device(s) 704 (e.g., a central processing unit (CPU), a graphics processing unit (GPU), or both), program memory device(s) 706, and data memory device(s) 708, which communicate with each other via a bus 710. The computing system 700 may further include display device(s) 712 (e.g., liquid crystals display (LCD), a flat panel, a solid state display, or a cathode ray tube (CRT)). The computing system 700 may include input device(s) 716 (e.g., a keyboard), cursor control device(s) 712 (e.g., a mouse), disk drive unit(s) 714, signal generation device(s) 718 (e.g., a speaker or remote control), and network interface device(s) 720.

The disk drive unit(s) 714 may include machine-readable medium(s) 720, on which is stored one or more sets of instructions 702 (e.g., software) embodying any one or more of the methodologies or functions disclosed herein, including those methods illustrated herein. The instructions 87 may also reside, completely or at least partially, within the program memory device(s) 706, the data memory device(s) 708, and/or within the processing device(s) 704 during execution thereof by the computing system 700. The program memory device(s) 706 and the processing device(s) 88 may also constitute machine-readable media. Dedicated hardware implementations 704, but not limited to, application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium containing instructions 702, or that which receives and executes instructions 702 from a propagated signal so that a device connected to a network environment 722 can send or receive voice, video or data, and to communicate over the network 722 using the instructions 702. The instructions 702 may further be transmitted or received over a network 722 via the network interface device(s) 720. The machine-readable medium may also contain a data structure for storing data useful in providing a functional relationship between the data and a machine or computer in an illustrative embodiment of the disclosed systems and methods.

While the machine-readable medium 720 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method of providing routes through heterogeneous subsystems in an optical network, the method comprising:
generating, using a processing device, a reachability matrix based on subnetwork information associated with the heterogeneous subsystems, the reachability matrix comprising a list of reachable paths in the subnetwork information, the heterogeneous subsystems being associated with different vendors;
generating, using the processing device, a topology associated with the optical network using the reachability matrix;
determining, using the processing device, a shortest path through the optical network using the reachability matrix and a cost model graph; and
providing, using the processing device, heterogeneous subsystems associated with the shortest path, regeneration locations associated with the shortest path, wavelengths associated with the shortest path, the topology, and the shortest path.

2. The method of claim 1, wherein generating the reachability matrix further comprises:
obtaining network topology information G(V,E) representing the optical network, V representing nodes associated with the optical network, E representing links associated with the optical network, the optical network comprising a plurality of subnetwork types;
determining a plurality of shortest paths $p_1, \ldots p_k$ linking a node pair (u,v), u representing a first node associated with the optical network, v representing a second node associated with the optical network, u and v being elements of V, k representing a parameter greater than 1; and
determining whether the plurality of shortest paths $p_1, \ldots p_k$ are reachable, the shortest paths that are reachable being the reachable paths.

3. The method of claim 2, further comprising modifying k such that the reachability matrix remains the same.

4. The method of claim 1, further comprising generating the reachability matrix using a shortest weight path based on the cost model graph.

5. The method of claim 1, further comprising generating the reachability matrix using a longest reachable path.

6. The method of claim 1, further comprising:
displaying optimized routes and link capacity utilization; and
supporting multiple users simultaneously using the graphical user interface, the graphical user interface comprising a menu, control panel, map panel, and information panel.

7. A computer-readable device storing instructions, that when executed by a processing device, cause the processing device to provide routes through heterogeneous subsystems in an optical network by performing operations comprising:
generating a reachability matrix based on subnetwork information associated with the heterogeneous subsystems, the reachability matrix comprising a list of reachable paths in the subnetwork information, the heterogeneous subsystems being associated with different vendors;
generating a topology associated with the optical network using the reachability matrix;
determining a shortest path through the optical network using the reachability matrix and a cost model graph; and
providing heterogeneous subsystems associated with the shortest path, regeneration locations associated with the shortest path, wavelengths associated with the shortest path, the topology, and the shortest path.

8. The computer-readable device of claims 7, wherein the operations further comprise:
obtaining network topology information G(V,E) representing the optical network, V representing nodes associated with the optical network, E representing links associated with the optical network, the optical network comprising a plurality of subnetwork types;
determining, using a vendor planning tool, a plurality of shortest paths $p_1, \ldots p_k$ linking a node pair (u,v), u representing a first node associated with the optical network, v representing a second node associated with the optical network, u and v being elements of V, k representing a parameter greater than 1; and
determining whether the plurality of shortest paths $p_1, \ldots p_k$ are reachable, the shortest paths that are reachable being the reachable paths.

9. The computer-readable device of claim 8, wherein the operations further comprise modifying k such that the reachability matrix remains the same.

10. The computer-readable device of claim 7, wherein the operations further comprise generating the reachability matrix using a longest reachable path.

11. The computer-readable device of claim 7, wherein the operations further comprise generating the reachability matrix using a shortest weight path based on the cost model graph.

12. An apparatus to provide routes through heterogeneous subsystems in an optical network comprising:
a processing device; and
a storage device to store instructions that, when executed by the processing device, causes the processing device to perform operations comprising:
generating a reachability matrix based on subnetwork information associated with the heterogeneous subsystems, the reachability matrix comprising a list of reachable paths in the subnetwork information, the heterogeneous subsystems being associated with different vendors;
generating a topology associated with the optical network using the reachability matrix;
determining a shortest path through the optical network using the reachability matrix and a cost model graph; and
providing heterogeneous subsystems associated with the shortest path, regeneration locations associated with the shortest path, wavelengths associated with the shortest path, the topology, and the shortest path.

13. The apparatus of claim 12, wherein the subnetwork information further comprises latitude and longitude information associated with nodes in the optical network.

14. The apparatus of claim 12, wherein the subnetwork information further comprises underlying fiber span information, capacity information, and available wavelength information associated with links in the optical network.

15. The apparatus of claim 12, wherein the subnetwork information represents existing circuits in the optical network.

16. The apparatus of claim 12, wherein the subnetwork information further comprises a section report, the section report comprising system type, node identification, effective date, terminate date, and project identification associated with a dense wavelength division multiplexer section in the subnetwork.

17. The apparatus of claim 12, wherein the operations further comprise:

generating the reachability matrix by obtaining network topology information, G(V,E) representing the optical network, V representing nodes associated with the optical network, E representing links associated with the optical network, the optical network comprising a plurality of subnetwork types;

determining, using a vendor planning tool, a plurality of shortest paths $p_1, \ldots p_k$ linking a node pair (u,v), u representing a first node associated with the optical network, v representing a second node associated with the optical network, u and v being elements of V, k representing a parameter greater than 1; and determining whether the plurality of shortest paths $p_1, \ldots p_k$ are reachable, the shortest paths that are reachable being the reachable paths.

18. The apparatus of claim 12, wherein the operations further comprise generating the reachability matrix using at least one longest reachable path.

19. The apparatus of claim 12, wherein the operations further comprise generating the reachability matrix using a shortest weight path based on the cost model graph.

20. The apparatus of claim 12, further comprising a graphical user interface to display optimized routes and link capacity utilization, the graphical user interface supporting multiple users.

\* \* \* \* \*